United States Patent
Kurtz

[11] 4,065,202
[45] Dec. 27, 1977

[54] PROJECTION SYSTEM FOR DISPLAY OF PARALLAX AND PERSPECTIVE

[75] Inventor: Robert L. Kurtz, Huntsville, Ala.

[73] Assignee: The United States of America as represented by the United States National Aeronautics and Space Administration, Washington, D.C.

[21] Appl. No.: 629,458

[22] Filed: Nov. 6, 1975

[51] Int. Cl.² .................................... G02B 27/00
[52] U.S. Cl. .................................... 350/3.5
[58] Field of Search ........................ 350/3.5

[56] References Cited
U.S. PATENT DOCUMENTS 3,632,181  1/1972  Lee ........................ 350/3.5

*Primary Examiner*—William L. Sikes
*Attorney, Agent, or Firm*—L. D. Wofford, Jr.; George J. Porter; John R. Manning

[57] ABSTRACT

A projection system for the display of parallax and perspective of a real image from a hologram in which a reference beam is projected in a sequence of several projections at selected angles of perspective through the hologram, this sequence being rapidly performed. The resulting angular spaced images emitting from the hologram are directed onto a mirror which is coordinately tilted to reflect all of the resulting images in register onto a screen where they appear as a single three-dimensional image.

6 Claims, 3 Drawing Figures

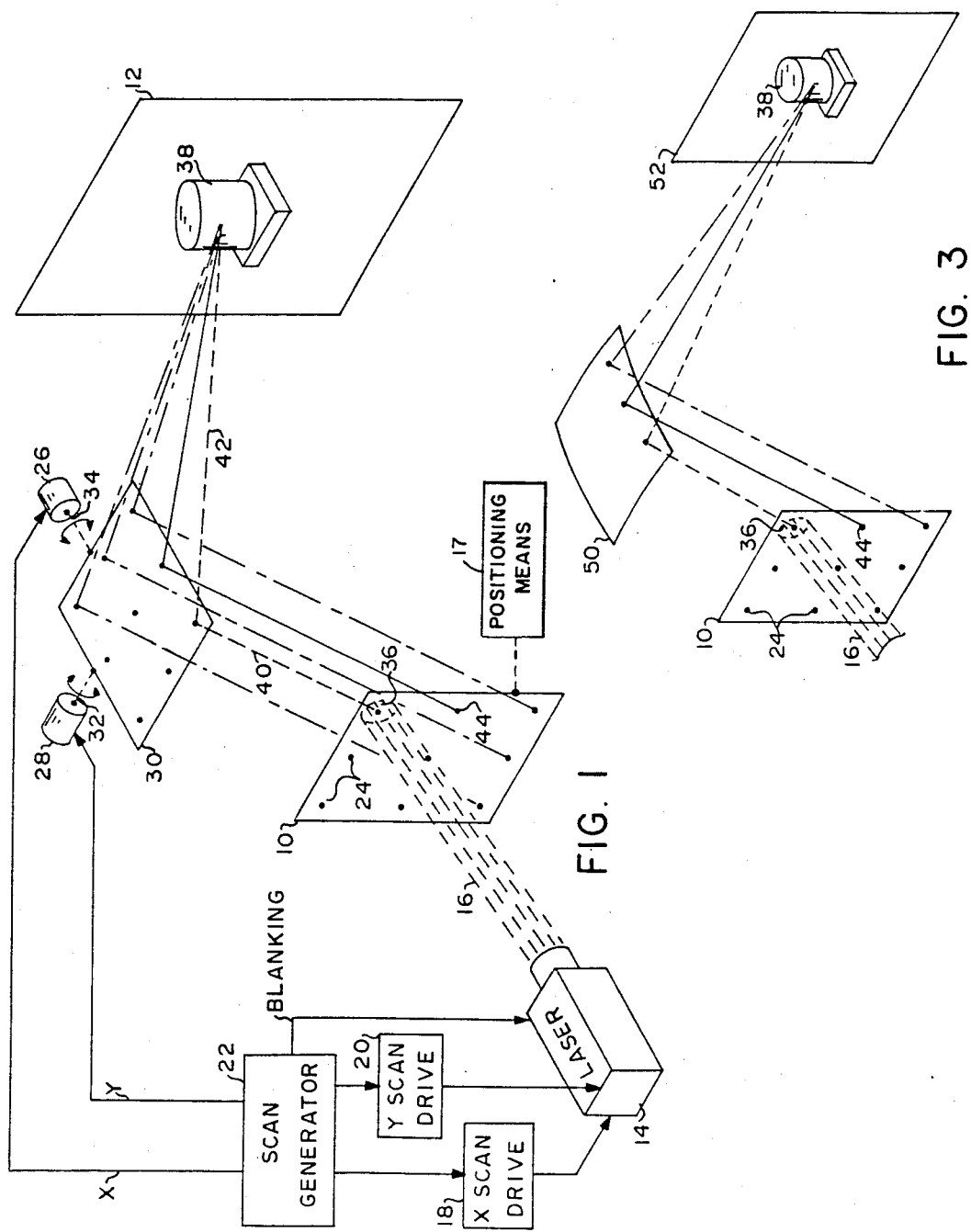

PROJECTION SYSTEM FOR DISPLAY OF PARALLAX AND PERSPECTIVE

ORIGIN OF THE INVENTION

The invention described herein was made by an employee of the United States Government, and may be manufactured and used by or for the Government of the United States of America for governmental purposes without the payment of any royalties thereon or therefor.

BACKGROUND OF THE INVENTION

1. Field of the Invention

This invention relates to the field of holography, and particularly to a system for the production of a three-dimensional real image from a hologram.

2. General Description of the Prior Art

Since the conception of holography, a heretofore unobtained goal has been that of displaying the real image of a hologram on a two-dimensional screen in such a manner that it will be perceived by viewers as a three-dimensional image and without the viewers employing any special viewing instrument.

It is the object of this invention to provide a system which will accomplish this goal.

SUMMARY OF THE INVENTION

In accordance with the invention, a laser beam, as a reference source, is projected through a hologram at a plurality of angles, or perspectives, the beam being blanked as it is moved between perspectives. The thus displaced exiting beams from the hologram are directed onto a mirror from which the beams are reflected onto a viewing screen, the mirror being adapted to bring all of the beams into register on the screen. In accordance with one aspect of the invention, the mirror would be a flat mirror which would be scanned, or oscillated, in synchronization with the deflection of the laser beam to accomplish registration; and in accordance with a second aspect of the invention, this mirror would be curved to accomplish image registration.

BRIEF DESCRIPTION OF THE DRAWINGS

FIG. 1 is a schematic illustration of an embodiment of the invention.

FIG. 2 is a pictorial illustration of multiple images, one for each perspective of the hologram illustrated in FIG. 1.

FIG. 3 is a schematic illustration of an alternate form of the invention.

DETAILED DESCRIPTION OF THE DRAWINGS

Referring initially to FIG. 1, hologram 10 is in the form of a transparency obtained in a conventional manner, and, in this case, is a holographic representation of the object reproduced on screen 12. Laser 14 is conventional and provides a collimated beam of coherent monochromatic light. Its beam, reference beam 16, is directed onto hologram 10 positioned by positioning means 17. X and Y beam scanners 18 and 20, diagrammatically illustrated, are conventional and typically would employ two galvanometer-operated mirrors, serially interrupting the laser beam. Y beam scanner 20 controls the movement of laser beam 16 to cause it to scan hologram 10 vertically; and X beam scanner 18 controls the movement of beam 16 horizontally. Scanners 18 and 20 are driven by scan generator 22, which provides drive signals coded to cause the displacement of beam 16 to move it between the nine selected coordinate regions centered about dots 24 on hologram 10. Generator 22 also includes means for applying a blanking signal to laser 14 when the scanners are being trained between the selected regions which are to be illuminated.

Scan generator 22 provides a like set, or synchronized set, of X and Y scanning coordinate signals to X and Y scanners 26 and 28 associated with scan mirror 30. They function to cause mirror 30 to scan about axis 32 in accordance with Y scan signals and about axis 34 in accordance with X scan signals. Scanners 28 and 30 are conventional and are diagrammatically illustrated. In practice, they would either comprise two gimbal-mounted galvanometers operating a single mirror, or two serially-arranged mirrors, each driven by a galvanometer about one of two perpendicular axes. The scanning movement of mirror 30 is synchronized with that of laser 14. Synchronization is such that, for example, with beam 16 directed at region 36, mirror 30 would be rotated by Y scan drive 28 to its maximum counter-clockwise position and rotated by its X scan drive 26 to its maximum clockwise position, as viewed with respect to mirror 30. This would cause the emitted image 38 (FIG. 2); derived from the illumination of region 36, to be centered on screen 12 (FIG. 1), as indicated by beam lines 40 and 42. Assume next that laser beam 16 is directed at region 44. Coordinately, mirror 30 would be rotated by its Y scan drive 28 to a mid position and by its X scan drive 26 to a maximum clockwise position, again, as viewed from mirror 30. The images of hologram 10 at these perspectives, shown as images 46 and 48 in FIG. 2, would be thus sequentially viewed; and, by virtue of the orientations of mirror 30, these perspectives would be projected in register at a center position on screen 12, as shown in FIG. 1. This process would continue until all perspectives illustrated in FIG. 2 and by the dot positions on hologram 10 of FIG. 1 are viewed and projected onto screen 12 which may be translucent.

As a result of the translation and projection of hologram 10 from multiple perspectives, there appears to the viewer a blending of the images into a single image which is perceived as a single three-dimensional representation of the image. Although both horizontally and vertically displaced perspectives are employed in the illustration of FIG. 1, it may, in a given case, be sufficient to employ only vertically and horizontally displaced perspectives to achieve a desired three-dimensional effect.

FIG. 3 illustrates an alternate embodiment of the invention in which curved mirror 50 replaces mirror 30. In this version, no scanning mirror is required as each projected beam strikes mirror 50 at an angle which will direct it to a common region on screen 52. Only horizontal scanning is illustrated for mirror 50. Where vertical and horizontal scans of a hologram are employed, mirror 50 would have a curvature.

While the projected beam illustrated in the drawings is illustrated as a collimated beam where image enlargement is desired, conventional optics would be included to provide a conjugate beam wherein the hologram, mirror, and screen would be placed in accordance with conventional positions for these units when employed for the construction of conventional forms of holograms.

The rate of scanning would typically be 20 to 25 perspectives per second, thus providing a complete reproduction of a scene utilizing nine perspectives in 1/25 second. This would enable nine scenes, or frames, to be projected at a 1/25-persecond rate, thus enabling the invention to be adaptable to motion pictures wherein the frame rate is approximately 25 per second. Other numbers of projections and ratios may, of course, be employed.

In addition to the quality of creating three-dimensional appearing images, motion may be displayed from a single hologram. Thus, as different perspectives are viewed at significantly spaced angles, for example, where the perspective views consist of three side views, a top view, and a bottom view, the reproduced image will appear to move as the scanning occurs to show each of these views. Accordingly, where in the past individual photographs would have been required for each perspective view, the present invention enables a single holographic transparency to reproduce multiple views, or perspectives, which may later be viewed sequentially and wherein the viewer's position with respect to each would appear to move as the perspectives are sequenced.

What is claimed is:

1. A three-dimensional holographic projection system comprising:
    positioning means for positioning a holographic transparency in a position where light may be transmitted through it;
    light source means for projecting a beam of monochromatic light along a movable path through a hologram positioned by said positioning means;
    scanning and blanking means coupled to said light source means for causing said beam to be selectively and sequentially displaced to selectively strike said hologram at a plurality of selected perspective angles and said light to be blanked except when striking said hologram at said selected perspective angles;
    a viewing screen; and
    mirror means responsive to resulting displaced beams emitted from the holographic transparency for reflecting said beam in register on said screen.

2. A system as set forth in claim 1 wherein said screen is translucent.

3. A system as set forth in claim 1 wherein said mirror means includes a plane mirror and means for synchronously, with said scanning means, tilting said mirror.

4. A system as set forth in claim 1 wherein said mirror means comprises a curved mirror.

5. A system as set forth in claim 1 wherein said scanning means includes means for scanning selected regions of a said hologram linearly along at least one line at discrete selected angles.

6. A system as set forth in claim 5 wherein:
    said scanning means comprises means for causing said beam to scan to horizontal and vertical positions, and said mirror means includes means for synchronously, with said scanning means, tilting said mirror means about two normal axes.

* * * * *